United States Patent
Park et al.

(10) Patent No.: US 9,154,988 B2
(45) Date of Patent: Oct. 6, 2015

(54) METHOD FOR REPORTING CHANNEL STATE INFORMATION IN WIRELESS COMMUNICATION SYSTEM, AND DEVICE THEREFOR

(75) Inventors: Jonghyun Park, Gyeonggi-do (KR); Hakseong Kim, Gyeonggi-do (KR); Hanbyul Seo, Gyeonggi-do (KR); Seungmin Lee, Gyeongg-do (KR); Kijun Kim, Gyeongg-do (KR); Hyungtae Kim, Gyeongg-do (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 13/992,186

(22) PCT Filed: Nov. 30, 2011

(86) PCT No.: PCT/KR2011/009208
§ 371 (c)(1),
(2), (4) Date: Jun. 6, 2013

(87) PCT Pub. No.: WO2012/077930
PCT Pub. Date: Jun. 14, 2012

(65) Prior Publication Data
US 2013/0267222 A1     Oct. 10, 2013

Related U.S. Application Data

(60) Provisional application No. 61/420,290, filed on Dec. 6, 2010.

(51) Int. Cl.
- H04W 24/00 (2009.01)
- H04W 24/10 (2009.01)
- H04B 7/04 (2006.01)
- H04B 7/06 (2006.01)
- H04L 1/00 (2006.01)

(52) U.S. Cl.
CPC ............. *H04W 24/10* (2013.01); *H04B 7/04* (2013.01); *H04B 7/0456* (2013.01); *H04B 7/065* (2013.01); *H04B 7/0617* (2013.01); *H04B 7/0619* (2013.01); *H04B 7/0639* (2013.01); *H04B 7/0645* (2013.01); *H04L 1/0026* (2013.01); *H04L 1/0027* (2013.01)

(58) Field of Classification Search
USPC ........................... 455/421, 422.1, 452.2, 513
See application file for complete search history.

(56) References Cited

U.S. PATENT DOCUMENTS

| 2007/0242770 | A1 | 10/2007 | Kim et al. | |
|---|---|---|---|---|
| 2007/0254597 | A1 | 11/2007 | Li et al. | |
| 2011/0142144 | A1* | 6/2011 | Allpress et al. | 375/259 |
| 2012/0082042 | A1* | 4/2012 | Lunttila et al. | 370/252 |

FOREIGN PATENT DOCUMENTS

| KR | 10-2009-0076784 A | 7/2009 |
|---|---|---|
| WO | WO 2009-123549 A2 | 10/2009 |

\* cited by examiner

*Primary Examiner* — Wayne Cai
*Assistant Examiner* — Said Elnoubi
(74) *Attorney, Agent, or Firm* — Dentons US LLP

(57) ABSTRACT

The present invention relates to a wireless communication system. Particularly, the present invention relates to a method and a device for reporting channel state information, the method comprising the steps of: carrying out operations for periodic reporting of a first channel state information item; and carrying out operations for periodic reporting of a second channel state information item, wherein the period for reporting the first channel state information item is longer than the period for reporting the second channel state information item, and the second channel state information item is determined on the basis of the first channel state information item.

12 Claims, 18 Drawing Sheets

FIG. 2
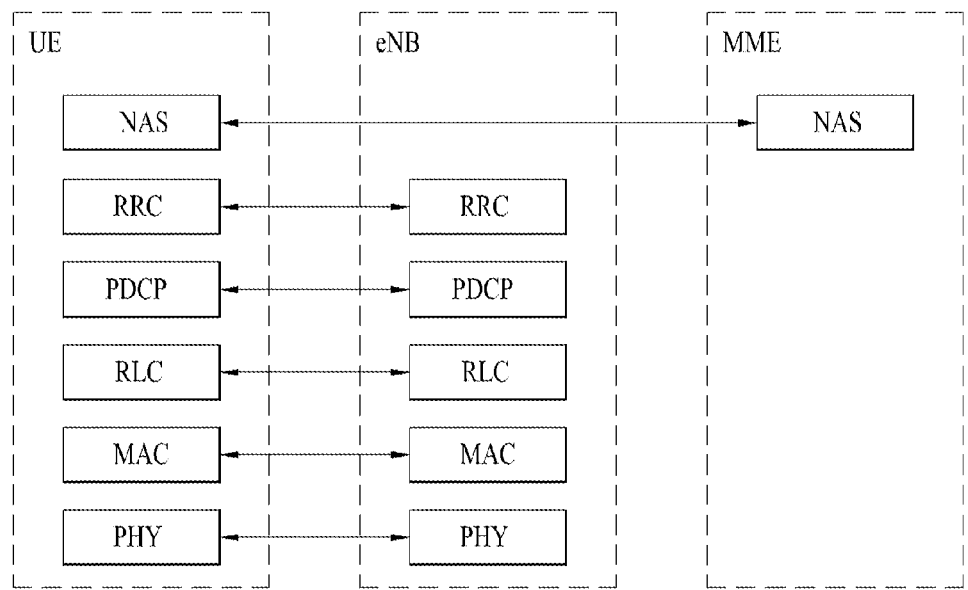
(a) control-plane protocol stack
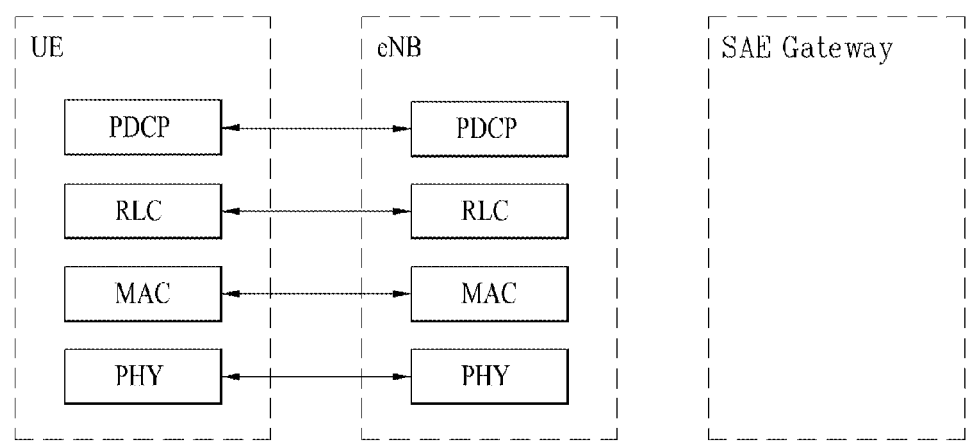
(b) user-plane protocol stack

FIG. 8

| CQI reporting mode | | PMI feedback type | |
|---|---|---|---|
| | | no PMI | single PMI |
| PUCCH CQI feedback type | wideband (wideband CQI) | mode 1-0 | mode 1-1 |
| | UE-selected (subband CQI) | mode 2-0 | mode 2-1 |

FIG. 13
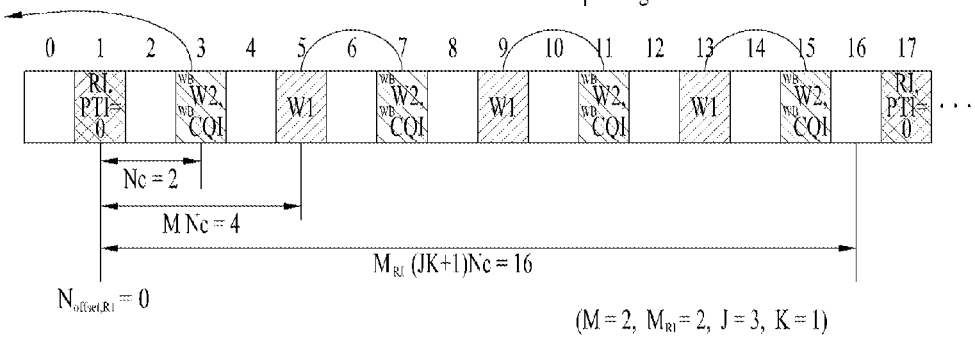
(a) PTI = 0, M = 2
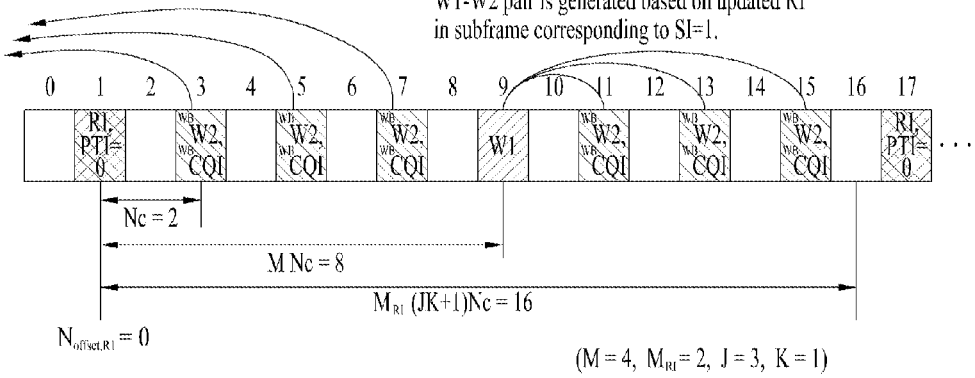
(b) PTI = 0, M = 4

FIG. 14
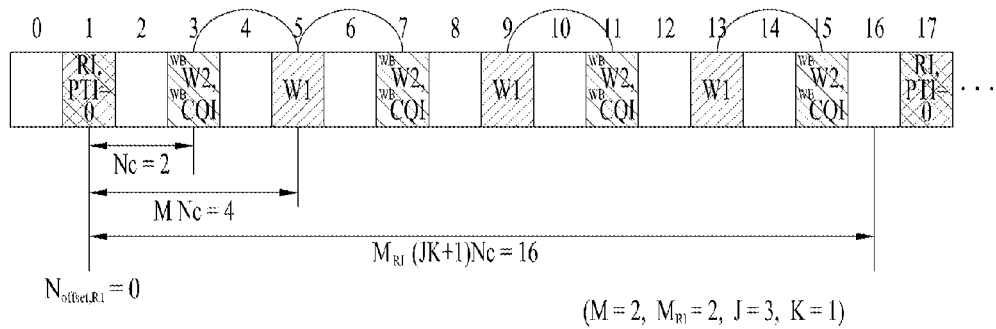
(a) PTI = 0, M = 2
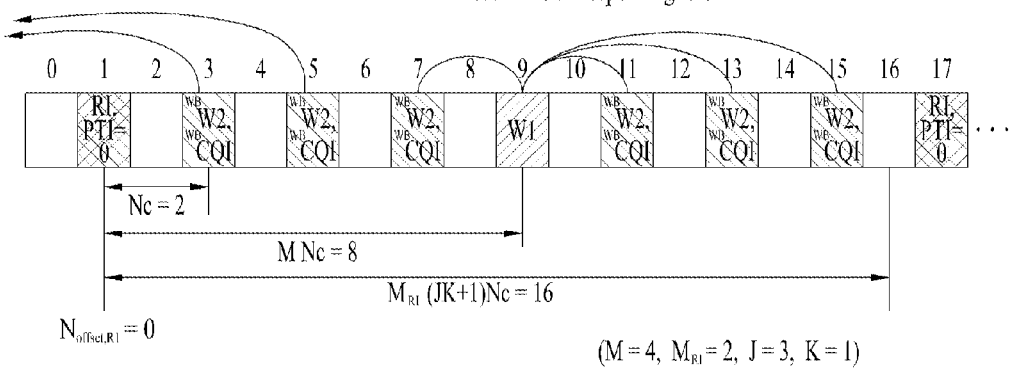
(b) PTI = 0, M = 4

FIG. 15
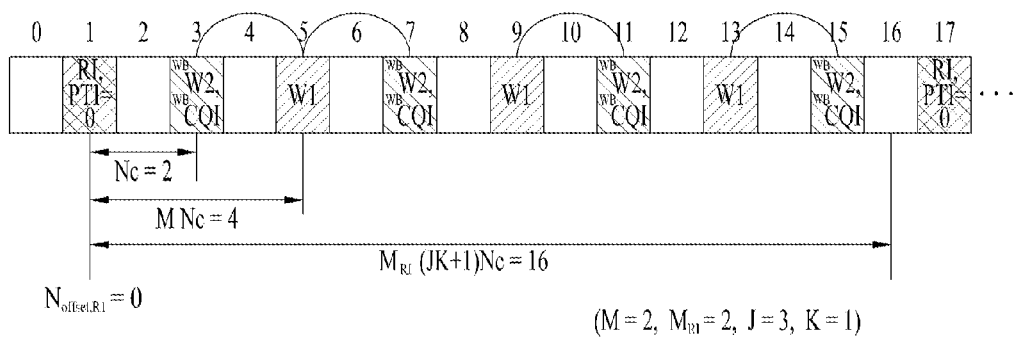
(a) PTI = 0, M = 2
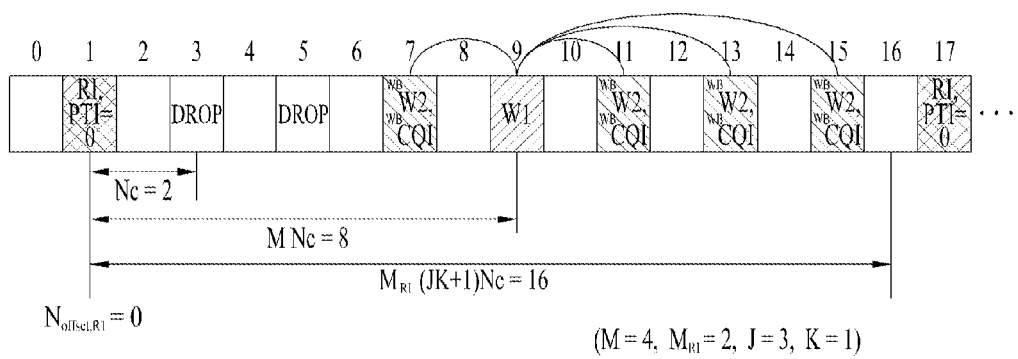
(b) PTI = 0, M = 4

FIG. 16
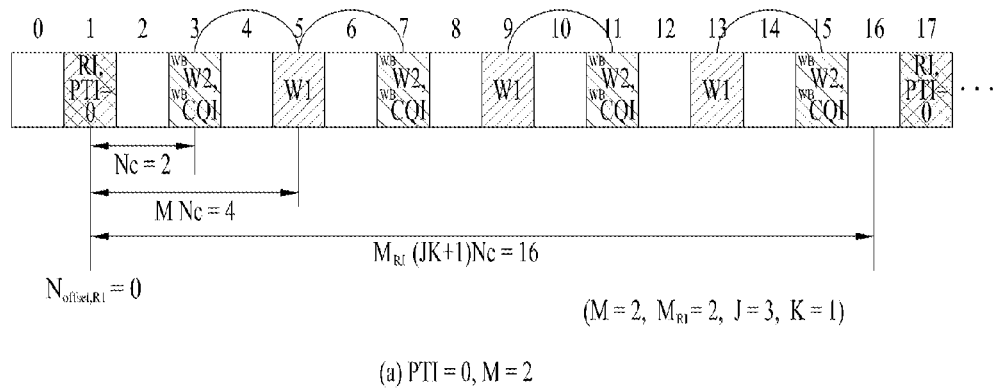
(a) PTI = 0, M = 2
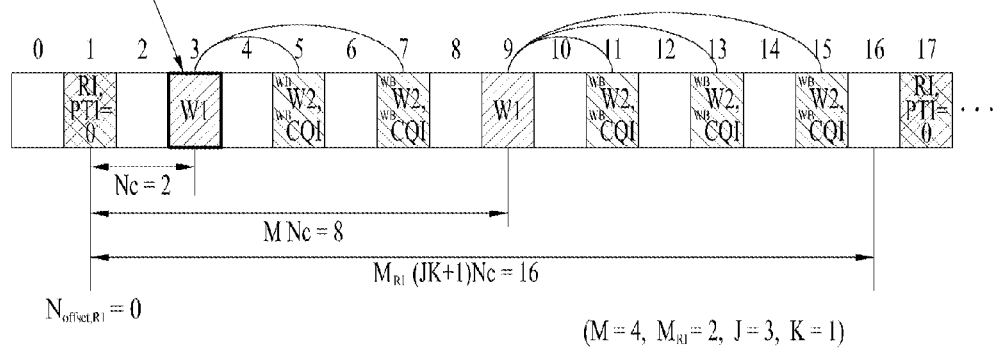
(b) PTI = 0, M = 4

FIG. 17
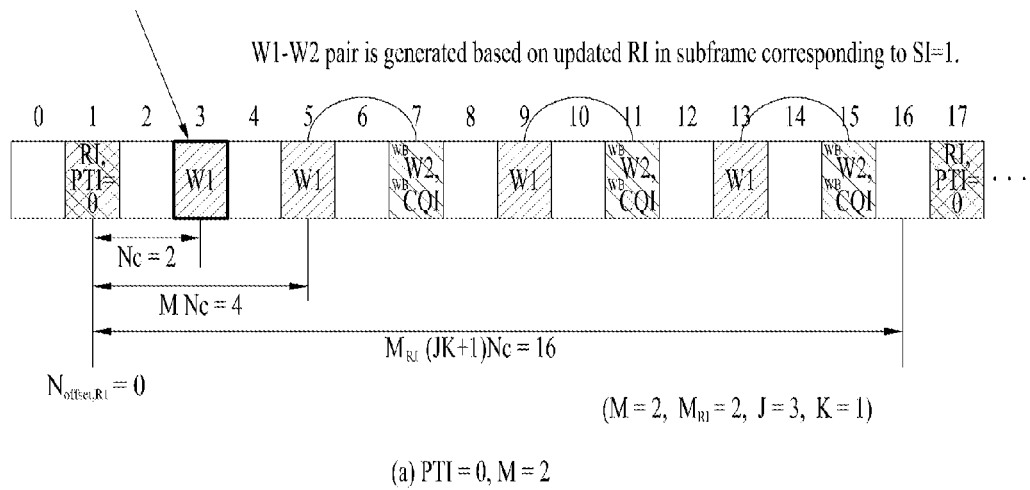
(a) PTI = 0, M = 2
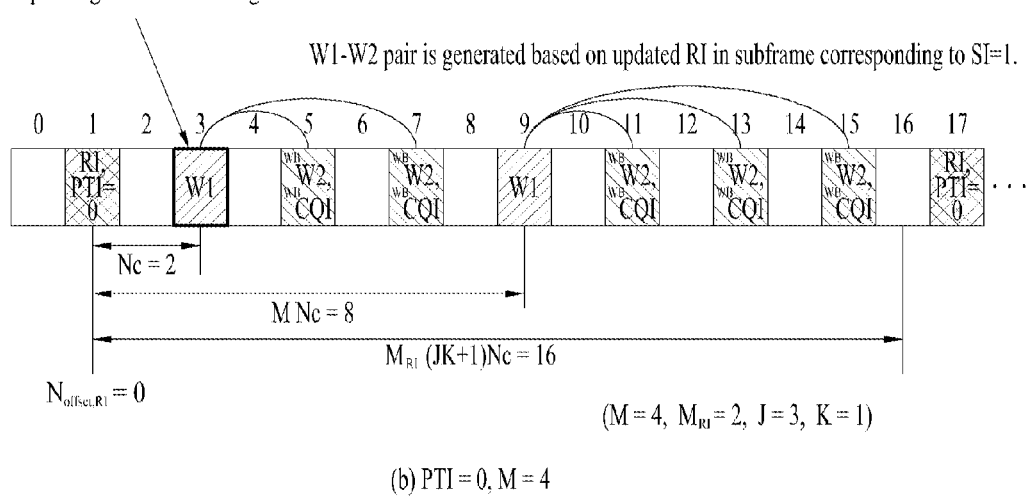
(b) PTI = 0, M = 4

METHOD FOR REPORTING CHANNEL STATE INFORMATION IN WIRELESS COMMUNICATION SYSTEM, AND DEVICE THEREFOR

The application is a national stage entry of International Application No. PCT/KR2011/009208, filed on Nov. 30, 2011, which claims benefit of U.S. Patent Application No. 61/420,290, filed on Dec. 6, 2010, which is hereby incorporated by reference in its entirety.

Technical Field

The present invention relates to a wireless communication system and, more particularly, to a method and device for reporting channel state information in a wireless communication system.

BACKGROUND ART

3GPP LTE ($3^{rd}$ Generation Partnership Project Long Term Evolution, referred to as 'LTE' hereinafter) will now be described as an exemplary wireless communication system to which the present invention is applicable.

FIG. 1 illustrates an E-UMTS (Evolved Universal Mobile Telecommunications System) as a wireless communication system. The E-UMTS is a system evolved from UMTS (Universal Mobile Telecommunications System) and currently standardized in 3GPP. The E-UMTS may be referred to as an LTE (Long Term Evolution) system. For details of the technical specifications of UMTS and E-UMTS, Release 7 and Release 8 of "$3^{rd}$ Generation Partnership Project; Technical specification Group Radio Access Network" are referred, respectively.

Referring to FIG. 1, the E-UMTS includes a user terminal (UE), an eNode B (eNB), and an access gateway (AG) located at the end of the network (E-UMTS) and connected to an external network. The eNB can simultaneously transmit multiple data streams for a broadcast service, multicast service and/or unicast service.

One or more cells are present per base station. A cell sets one of bandwidths of 1.25 MHz, 2.5 MHz, 5 MHz, 10 MHz, 15 MHz and 20 MHz for a carrier and provides downlink/uplink transmission service to a plurality of UEs. Different cells may provide different bandwidths. An eNB controls data transmission/reception to/from a plurality of UEs. The eNB transmits downlink scheduling information about downlink data to a UE to inform the UE of a time/frequency region in which the downlink data will be transmitted, coding information, data size, hybrid automatic repeat and request (HARQ) related information, etc. The eNB transmits uplink scheduling information about uplink data to the UE to inform the UE of a time/frequency domain that can be used by the UE, coding information, data size, HARQ related information, etc. An interface for user traffic or control traffic transmission may be used between eNBs. Core Network (CN) is consist of access gateway (AG), network node for registration of UE user, etc. Access gateway (AG) controls the mobility of UE by a unit of Tracking Area (TA) consisted of a plurality of cells.

While wireless communication technology has been developed into LTE based on wideband code division multiple access (WCDMA), demands and expectations of users and providers continue to increase. Furthermore, technical evolution is needed for future competitiveness of wireless communication technology since other wireless access technologies are under development. For technical evolution, reduction of cost per bit, service availability increase, flexible use of frequency band, simplified structure, open interface, appropriate power consumption of terminals, etc. are required.

DISCLOSURE

Technical Problem

An object of the present invention devised to solve the problem lies in a method and device for reporting channel state information in a wireless communication system.

Technical Solution

The object of the present invention can be achieved by providing a method for reporting channel state information by a UE in a wireless communication system, the method including: carrying out operations for periodic reporting of first channel state information; and carrying out operations for periodic reporting of second channel state information, wherein a reporting period of the first channel state information is longer than a reporting period of the second channel state information and the second channel state information is determined on the basis of the first channel state information, wherein when a report of the first channel state information is dropped at a first time, at least one report of the second channel state information, scheduled to be performed first between the first time and a second time for the next report of the first channel state information, is dropped.

In another aspect of the present invention, provided herein is a UE configured to transmit channel state information in a wireless communication system, the UE including an RF module and a processor, wherein the processor carries out operations for periodic reporting of first channel state information and carries out operations for periodic reporting of second channel state information, wherein a reporting period of the first channel state information is longer than a reporting period of the second channel state information and the second channel state information is determined on the basis of the first channel state information, wherein when a report of the first channel state information is dropped at a first time, at least one report of the second channel state information, scheduled to be performed first between the first time and a second time for the next report of the first channel state information, is dropped.

At least one report of the second channel state information, dropped between the first time and the second time, may be replaced by the report of the first channel state information.

When a plurality of reports of the second channel state information are scheduled between the first time and the second time, only the first report of the second channel state information from among the plurality of reports of the second channel state information may be replaced by the report of the first channel state information.

When a plurality of reports of the second channel state information is scheduled between the first time and the second time, only the last second channel state information from among the plurality of reports of the second channel state information may be reported and the last second channel state information is determined based on the first channel state information, scheduled to the second time.

The first channel state information may include a first precoding matrix indicator (PMI), the second channel state information may include a second PMI and the first PMI and the second PMI may be combined and used to configure a codebook.

The first PMI may be a long term PMI and the second PMI may be a short term PMI.

The first channel state information and the second channel state information may be transmitted through a physical uplink control channel (PUCCH).

Advantageous Effects

According to the present invention, it is possible to report channel state information in a wireless communication system more effectively.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

FIG. 2 illustrates a control plane and a user plane of a radio interface protocol between a UE and E-UMTS based on the 3GPP wireless access network specification.

FIGS. 8 to 11 illustrate periodic channel state information reporting.

FIGS. 13 to 17 illustrate methods for configuring channel state information feedbacks/codebooks according to embodiments of the present invention.

BEST MODE

Figure 1:
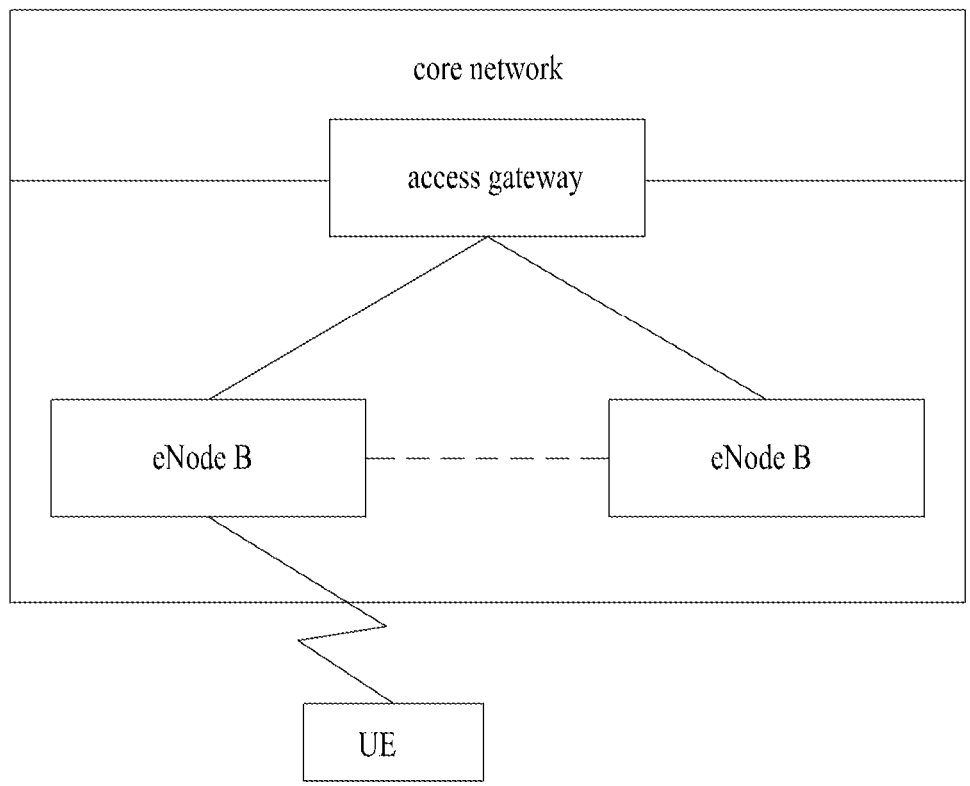
FIG. 1 illustrates E-UMTS network structure as an exemplary wireless communication system.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In embodiments described below, technical features of the present invention are applied to 3GPP.

While the following description focuses on LTE and LTE-A, this is purely exemplary and thus should not be construed as limiting the present invention. Furthermore, while the following description is given based on FDD, embodiments of the present invention can be easily transformed and applied to H-FDD or TDD.

FIG. 2 illustrates a control plane and a user plane of a radio interface protocol between a UE and E-UMTS based on the 3GPP wireless access network specification. The control plane refers to a path through control messages that a UE and a network use to manage a call are transmitted. The user plane refers to a path through which data generated in an application layer, for example, audio data or Internet packet data is transmitted.

A physical layer, a first layer, provides an information transfer service to a higher layer using a physical channel. The physical layer is linked to a medium access control (MAC) layer corresponding to a higher layer through a transport channel. Data is transmitted between the MAC layer and the physical layer through the transport channel. Data is transmitted between physical layers of a transmitter and a receiver through a physical channel. The physical channel uses time and frequency as radio resources. Specifically, the physical layer is modulated according to OFDMA (Orthogonal Frequency Division Multiple Access) on downlink and modulated according to SC-FDMA (Single Carrier Frequency division Multiple Access) on uplink.

The MAC layer of a second layer, provides a service to a radio link control (RLC) layer corresponding to a higher layer through a logical channel. The RLC layer supports reliable data transmission. Functions of the RLC layer may be implemented as functional blocks in the MAC layer. A PDCP (Packet Data Convergence Protocol) layer of a second layer, performs a header compression function of reducing unnecessary control information to efficiently transmit an IP packet such as IPv4 or IPv6 in a radio interface having a narrow bandwidth.

An RRC (Radio Resource Control) layer corresponding to the lowest of three layers is defined only in the control plane. The RRC layer controls logical channels, transport channels and physical channels with respect to configuration, reconfiguration and release of radio bearers (RBs). An RB refers to a service provided by the second layer for data transmission between a UE and a network. For data transmission between the UE and network, RRC layers of the UE and network exchange RRC messages. The UE is in an RRC connected mode when the RRC layers of the UE and network are RRC connected and is otherwise in an idle mode. A NAS (Non-Access Stratum) layer higher than the RRC layer performs session management and mobility management.

A cell constituting an eNB is set to one of bandwidths of 1.25 MHz, 2.5 MHz, 5 MHz, 10 MHz, 15 MHz and 20 MHz and provides a downlink or uplink transmission service to a plurality of UEs. Different cells may provide different bandwidths.

Downlink transport channels for transmitting data from a network to a UE include a broadcast channel (BCH) for transmitting system information, a paging channel (PCH) for transmitting a paging message, a downlink shared channel (SCH) for transmitting a user traffic or control message, etc. A traffic or control message of downlink multicast or broadcast service may be transmitted through the downlink SCH or a downlink multicast channel (MCH). Uplink transport channels for transmitting data from a UE to a network include a random access channel (RACH) for transmitting an initial control message and an uplink SCH for transmitting a user traffic or control message. Logical channels which are higher than transport channels and are mapped to the transport channels include a broadcast control channel (BCCH), a paging control channel (PCCH), a common control channel (CCCH), a multicast control channel (MCCH), a multicast traffic channel (MTCH), etc.

Figure 3:
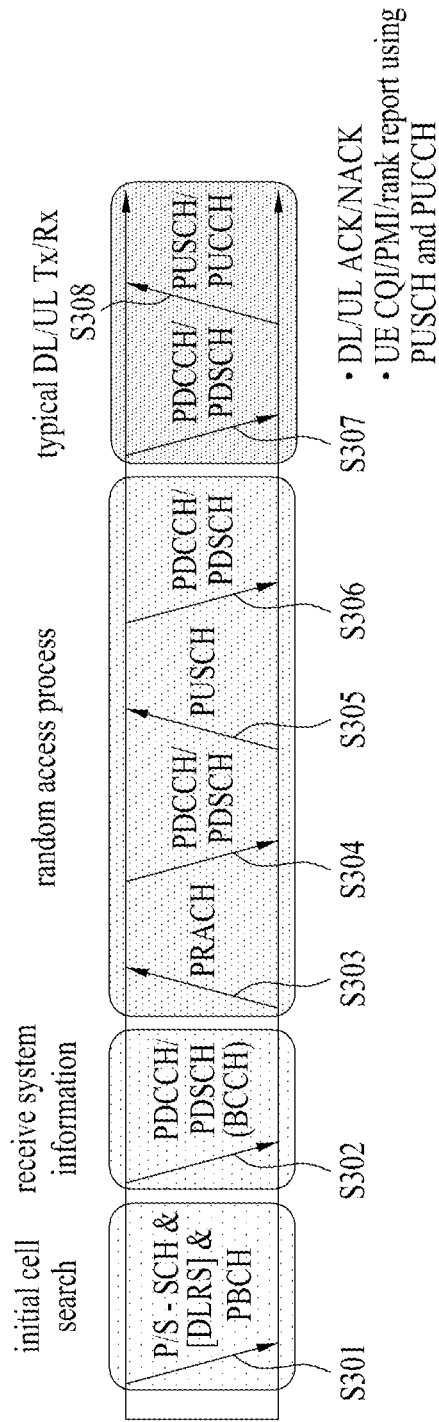
FIG. 3 illustrates physical channels used for a 3GPP system and a method of transmitting a signal using the physical channels.

FIG. 3 illustrates physical channels used for a 3GPP system and a general method of transmitting a signal using the physical channels.

When powered on or when a UE initially enters a cell, the UE performs initial cell search involving synchronization with an eNB (S301). For initial cell search, the UE is synchronized with the eNB and acquires information such as a cell ID by receiving a primary synchronization channel (P-SCH) and a secondary synchronization channel (S-SCH) from the eNB. Then the UE may receive broadcast information from the eNB on a physical broadcast channel. The UE may determine a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH (S302).

When the UE initially accesses the eNB or there is no radio resource for signal transmission, the UE may perform a random access procedure (RACH) to access the eNB (S303 to S306). For random access, the UE may transmit a preamble to the eNB on a physical random access channel (PRACH) (S303 and S305) and receive a response message for preamble on a PDCCH and a PDSCH corresponding to the PDCCH (S304 and S306). In the case of contention-based random access, the UE may additionally perform a contention resolution procedure.

After the foregoing procedure, the UE may receive a PDCCH/PDSCH (S307) and transmit a physical uplink shared channel (PUSCH)/physical uplink control channel (PUCCH) (S308), as a general downlink/uplink signal transmission procedure. Particularly, the UE receives downlink control information (DCI) through a PDCCH. The DCI includes control information such as information about allocation of resources to the UE and a format thereof is designed according to application.

Control information transmitted from the UE to the eNB or control information transmitted from the eNB to the UE through uplink includes a downlink/uplink ACK/NACK signal, a channel quality indicator (CQI), a precoding matrix index (PMI), a rank indicator (RI), etc. In the case of 3GPP LTE, the UE can transmit the CQI/PMI/RI on a PUSCH and/or a PUCCH.

Figure 4:
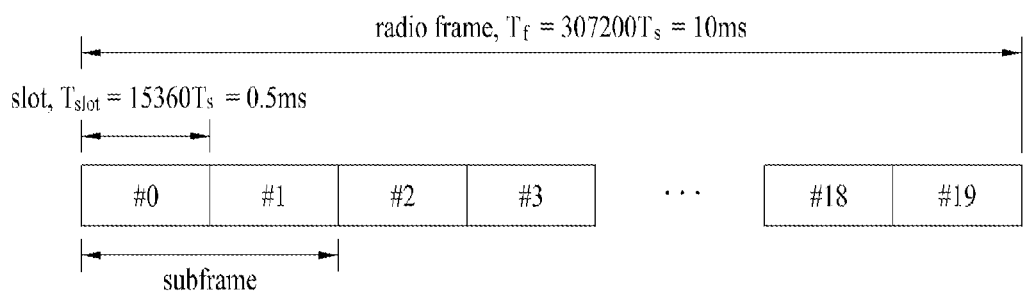
FIG. 4 illustrates a radio frame structure used in LIE.

FIG. 4 illustrates a radio frame structure used in LTE.

Referring to FIG. 4, a radio frame has a length of 10 ms (307200×Ts) and includes 10 subframes of equal size. Each subframe has a length of 1 ms and includes two slots.

Each slot has a length of 0.5 ms (15360×Ts). Here, Ts denotes sampling time and is represented as Ts=1/(15 kHz× 2048)=3.1552×$10^{-8}$ (about 33 ns). Each slot includes a plurality of OFDM symbols in the time domain and a plurality of resource blocks in the frequency domain. In LTE, one resource block (RB) includes (12 subcarriers×7 (or 6) OFDM symbols). A unit time for transmitting data, a transmission time interval (TTI), may be defined based on one or more subframes. The above-described radio frame structure is exemplary and the number of subframes included in a radio frame, the number of slots included in a subframe, and the number of OFDM symbols included in a slot may be modified in various manner.

Figure 5:
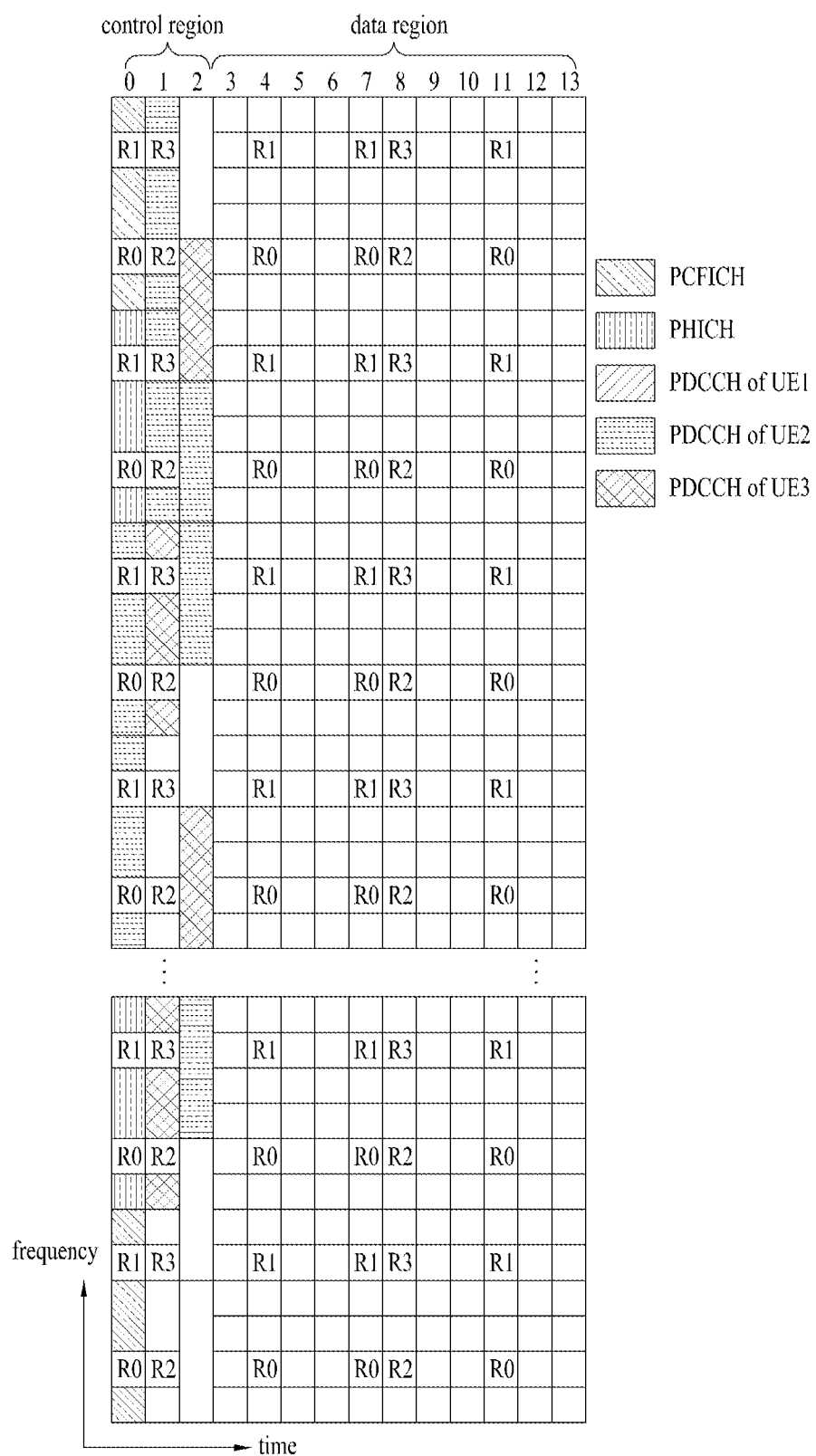
FIG. 5 illustrates a downlink radio frame structure used in LIE.

FIG. 5 illustrates control channels included in a control region of a subframe in a downlink radio frame.

Referring to FIG. 5, a subframe includes 14 OFDM symbols. One to three OFDM symbols located in a front portion of the subframe are used as a control region and the remaining eleven to thirteen OFDM symbols are used as a data region. In FIGS. 5, R1 to R4 denote reference signals (RSs) or pilot signals with respect to antennas #0 to #3. RSs are fixed in a predetermined pattern within the subframe irrespective of the control region and the data region. Control channels are allocated to resources to which RSs are not assigned in the control region and traffic channels are allocated to resources to which RSs are not assigned in the data region. Control channels allocated to the control region include a physical control format indicator channel (PCFICH), a physical hybrid-ARQ indicator channel (PHICH), a physical downlink control channel (PDCCH), etc.

The PCFICH informs a UE of information regarding the number of OFDM symbols used for a PDCCH for each subframe. The PCFICH is transmitted at the first OFDM symbol and set prior to the PHICH and PDCCH. The PCFICH is composed of 4 resource element groups (REGs) which are dispersed in the control region based on cell ID. One REG includes 4 resource elements (REs). An RE is a minimum physical resource defined by (a subcarrier×an OFDM symbol). PCFICH values indicate 1 to 3 or 2 to 4 and modulated according to quadrature phase shift keying (QPSK).

The PHICH is a HARQ indicator channel and is used to carry HARQ acknowledgment (ACK)/negative-acknowledgment (NACK) signal for uplink transmission. That is, DL ACK/NACK information for UL HARQ is transmitted on the PHICH. The PHICH is composed of one REG and is cell-specifically scrambled. ACK/NACK is indicated a 1-bit signal and is modulated according to binary phase shift keying (BPSK). Modulated ACK/NACK is spread with a spreading factor (SF) of 2 or 4. A plurality of PHICHs mapped to the same resource form a PHICH group. The number of PHICHs multiplexed to the PHICH group is determined by the number of spreading codes. The PHICH (group) is repeated three times to obtain diversity gain in the frequency domain and/or time domain.

The PDCCH is allocated to n OFDM symbols located in the front portion of the subframe. Here, n is an integer greater than 1 and is indicated by the PCFICH. The PDCCH is composed of one or more CCEs. The PDCCH carries information regarding resource allocation of as a transmission channel, a paging channel (PCH) and downlink-shared channel (DL-SCH), uplink scheduling grant, HARQ information, etc. to each UE or UE group. The PCH and DL-SCH are transmitted on a PDSCH. Accordingly, an eNB and a UE generally transmit and receive data through the PDSCH except for specific control information or specific service data.

Information about one or more UEs to which data of the PDSCH will be transmitted and information about how the UEs receive and decode the PDSCH data are included in a PDCCH and transmitted. For example, if a specific PDCCH is CRC-masked with a radio network temporary identity (RNTI) "A" and information about data transmitted using a radio resource (e.g. frequency position) "B" and a DCI format "C", that is, transport format information (e.g. transport block size, modulation scheme, coding information, etc.) is transmitted through a specific subframe, a UE in a cell monitors the PDCCH using RNTI information included therein. If one or more UEs include the RNTI "A", the UEs receive the PDCCH and receive a PDSCH indicated by "B" and "C" through information of the received PDCCH.

Figure 6:
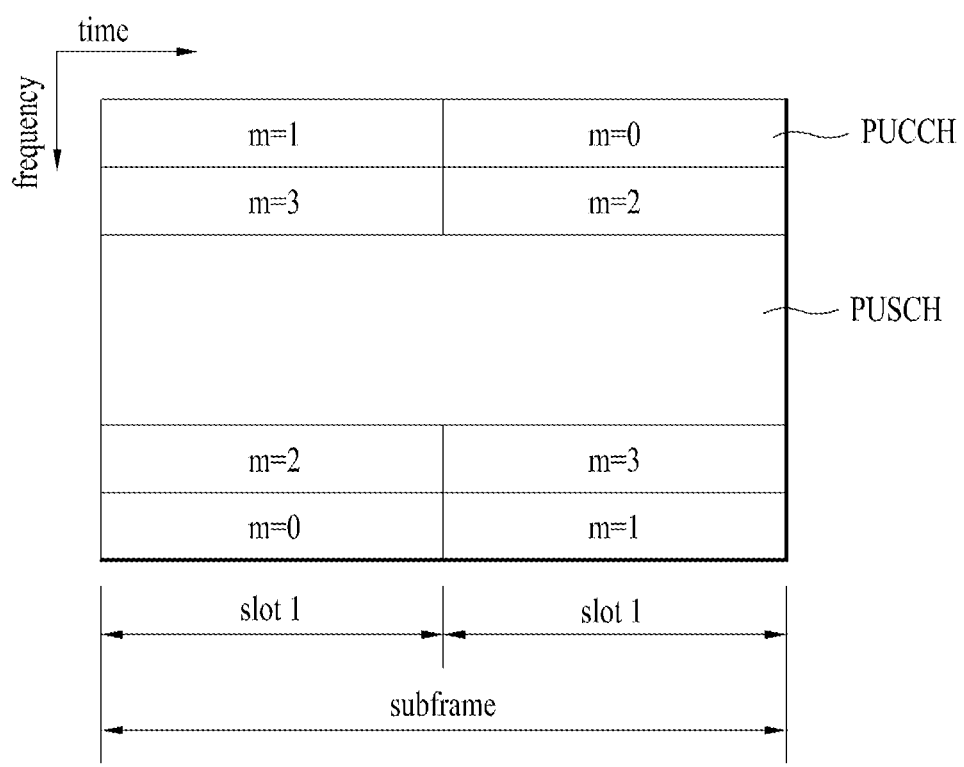
FIG. 6 illustrates an uplink radio subframe structure used in LTE.

FIG. 6 illustrates an uplink subframe structure used in LTE.

Referring to FIG. 6, an uplink subframe can be divided into a region to which a physical uplink control channel (PUCCH) carrying control information is allocated and a region to which a physical uplink shared channel (PUSCH) carrying user data is allocated. The middle part of the subframe is allocated to the PUSCH and both sides of the data region in the frequency domain are allocated to the PUCCH. Control information transmitted on the PUCCH includes ACK/NACK used for HARQ, a CQI indicating a downlink channel state, an RI for MIMO, a scheduling request (SR) corresponding to an uplink resource allocation request, etc. A PUCCH for one UE uses a resource block occupying different frequencies in slots within the subframe. That is. 2 resource blocks allocated to the PUCCH are frequency hopped at the slot boundary. FIG. 6 illustrates allocation of a PUCCH with m=0, a PUCCH with m=1, a PUCCH with m=2 and a PUCCH with m=3 to the subframes.

A description will be given of a multiple-input multiple-output (MIMO) system. MIMO uses plural transmit antennas and plural receive antennas and can improve data transmission/reception efficiency. That is, the throughput and performance of a wireless communication system can be improved by using a plurality of antennas at a transmitter or a receiver of the wireless communication system. In the following, MIMO may be referred to as 'multi-antenna'.

MIMO does not depend on a single antenna path to receive a whole message. Rather, MIMO completes the message by combining data fragments received through a plurality of antennas. MIMO can increase data transmission rate within a cell area having a specific size or extend system coverage at a given data transmission rate. MIMO is broadly applicable to mobile terminals, relays, etc. It is possible to overcome the limit of throughput of conventional mobile communication sing a single antenna through MIMO.

Figure 7:
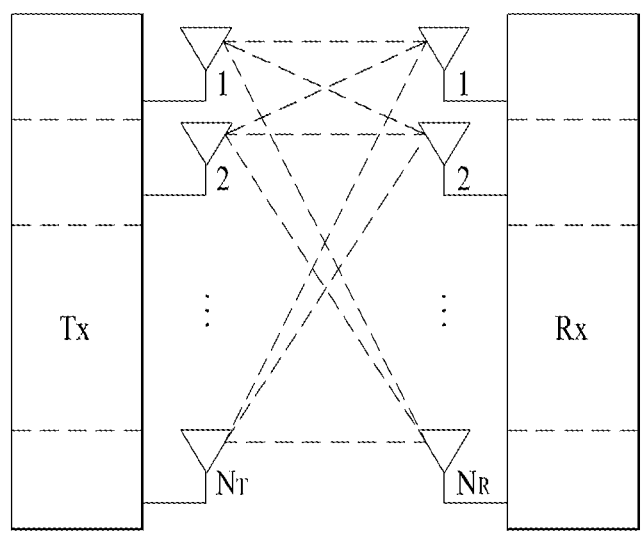
FIG. 7 illustrates a configuration of a MIMO communication system.

FIG. 7 illustrates a configuration of a typical MIMO communication system. When a transmitter uses $N_T$ transmit (Tx) antennas and a receiver uses $N_R$ receive (Rx) antennas, theoretical channel transmission capacity is increased, compared to use of a plurality of antennas at only one of the transmitter and the receiver. Channel transmission capacity is increased in proportion to the number of antennas. Therefore, transmission rate and frequency efficiency can be increased. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas. Here, $R_i$ corresponds to the smaller of $N_T$ and $N_R$.

$$R_i = \min(N_T, N_R) \quad \text{[Equation 1]}$$

For instance, a MIMO communication system with 4 Tx antennas and 4 Rx antennas may theoretically achieve a four-fold increase in transmission rate, relative to a single-antenna system. The theoretical increase in transmission rate of MIMO communication was demonstrated in the mid-90s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. As illustrated in FIG. 7, it is assumed that $N_T$ Tx antennas and $N_R$ Rx antennas are present. Regarding a transmission signal, up to $N_T$ pieces of information can be transmitted through the $N_T$ Tx antennas, as expressed by the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmitted signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These $N_T$ transmitted signals $x_1, x_2, \ldots, x_{N_T}$ are represented as a vector X, which may be determined by Equation 5. Herein, $w_{ij}$ denotes a weight between an $i^{th}$ Tx antenna and a $j^{th}$ piece of information. W is called a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

In general, the rank of a channel matrix physically means a maximum number of given channels through which different pieces of information can be transmitted. Accordingly, the rank of the channel matrix is defined as the minimum of the number of independent rows and columns. Accordingly, the rank of the channel matrix is not larger than the number of rows or columns. For example, the rank of the channel matrix H, rank(H) is limited by Equation 6.

$$\text{rank}(H) \leq \min(N_T, N_R) \quad \text{[Equation 6]}$$

Let information transmitted using MIMO be defined as 'transmission stream' or simply 'stream'. 'Stream' can also be referred to as 'layer'. The number of transmission streams cannot be larger than the channel rank. Accordingly, the channel matrix H can be expressed by Equation 7.

$$\text{\# of streams} \leq \text{rank}(H) \leq \min(N_T, N_R) \quad \text{[Equation 7]}$$

Here, "# of streams" denotes the number of streams. It is noted that one stream can be transmitted through one or more antennas.

There may be various methods for matching one or more streams to a plurality of antennas. These methods can be described according to MIMO types as follows. Transmission of one stream through a plurality of antennas may be regarded as a spatial diversity scheme and transmission of a plurality of streams through a plurality of antennas may be regarded as a spatial multiplexing scheme. A hybrid of spatial diversity and spatial multiplexing is possible.

A description will be given of channel state information (CSI) reporting. Open-loop MIMO operating without CSI and closed-loop MIMO operating based on CSI are present in LTE. Particularly, in closed-loop MIMO, each of an eNB and a UE can perform beamforming based on CSI to obtain MIMO antenna multiplexing gain. To obtain CSI from the UE, the eNB instructs the UE to feed back CSI with respect to a downlink signal by allocating a PUCCH or a PUSCH to the UE.

CSI is categorized into an RI, PMI and CQI. The RI indicates rank information of a channel, as described above and represents the number of streams that can be received by a UE through the same frequency-time resources. The RI is determined by long term fading of the channel, and thus the RI is fed back to an eNB at a longer period than PMI and CQI.

The PMI is a value in which spatial characteristics of a channel are reflected and indicates a precoding matrix index of an eNB preferred by a UE based on a metric such as SINR. The CQI indicates channel intensity and represents a reception SINR that can be obtained by the eNB using the PMI.

In an evolved communication system such as LTE-A, additional multi-user diversity is obtained using MU-MIMO (multi-user MIMO). Since interference is present between UEs multiplexed in the antenna domain in MU-MIMO, accuracy of CSI may largely affect not only a UE that reports the CSI but also interference of other multiplexed UEs. Accordingly, MU-MIMO requires more accurate CSI reporting than SU-MIMO.

In LTE-A standard, a final PMI is divided into W1 corresponding to a long-term and/or wideband PMI and W2 corresponding to a short-term and/or subband PMI.

A long-term covariance matrix of a channel, represented by Equation 8, can be used as a hierarchical codebook transformation constituting a final PMI based on W1 and W2.

$$W = \text{norm}(W1\,W2) \quad \text{[Equation 8]}$$

In Equation 8, W2 corresponds to a short-term PMI and is a codeword of a codebook configured to reflect short-term channel state information, W is a codeword (in other words, precoding matrix) of a final codebook, and norm(A) denotes a matrix in which the norm of each column of matrix A is normalized to 1.

W1 and W2 have structures as represented by Equation 9.

$$W1(i) = \begin{bmatrix} X_i & 0 \\ 0 & X_i \end{bmatrix}, \quad \text{[Equation 9]}$$

where $X_i$ is Nt/2 by M matrix.

$$W2(j) = \begin{bmatrix} e_M^k & e_M^l & e_M^m \\ \alpha_i e_M^k & \beta_i e_M^l & \cdots & \gamma_i e_M^m \end{bmatrix}$$

(if rank=r), where $1 \leq k,l,m \leq M$ and k,l,m are integer. wherein Nt denotes the number of Tx antennas, M is the number of columns of a matrix $X_i$ and represents that the matrix $X_i$ includes M candidate column vectors, and $e_M^k$, $e_M^l$ and $e_M^m$ respectively indicate k-th, l-th and m-th column vectors in which only k-th, l-th and m-th elements from among M elements are 1 and the remaining elements are 0. In addition, $\alpha_j$, $\beta_j$ and $\gamma_j$ are complex values having unit norm and represent application of phase rotation to the k-th, l-th and m-th column vectors of the matrix $X_i$. Furthermore, i is an integer greater than 0 and denotes a PMI indicating W1 and j is an integer greater than 0 and denotes a PMI indicating W2.

In the codeword structure represented by Equation 9, cross polarized antennas are used. When antenna spacing is narrow, for example, when a distance between neighboring antennas is less than half a signal wavelength, correlation characteristics of a channel are reflected in the codeword structure. The cross polarized antennas can be categorized into a horizontal antenna group and a vertical antenna group which have uniform linear array (ULA) antenna characteristics and are co-located.

Therefore, correlation between antennas in each group has the same linear phase increment and correlation between antenna groups has phase rotation characteristics. Consequently, it is necessary to design the codebook by reflecting characteristics of a channel in the codebook because the codebook is composed of values obtained by quantizing the channel. For convenience of description, a rank-1 codeword generated in the above-described structure is represented in Equation 10.

$$W1(i) * W2(j) = \begin{bmatrix} X_i(k) \\ \alpha_j X_i(k) \end{bmatrix} \quad \text{[Equation 10]}$$

In Equation 10, the codeword is represented by a vector of $N_T$ (the number of Tx antennas)×1 and is composed of an upper vector $X_i(k)$ and a lower vector $a_j X_i(k)$ which respectively represent correlations between horizontal antenna groups and vertical antenna groups. $X_i(k)$ is preferably represented as a vector having linear phase increment in which correlation between antennas in each antenna group is reflected and can use a DFT matrix.

As described above, CSI includes a CQI, PMI and RI although it is not limited thereto, and all or some of the CQI, PMI and RI are transmitted according to the transmission mode of each UE. Periodic transmission of CSI is referred to as periodic reporting and transmission of CSI at the request of an eNB is referred to as aperiodic reporting. In the case of aperiodic reporting, a request bit included in uplink scheduling information transmitted from the eNB is sent to a UE. Then, the UE transmits CSI considering a transmission mode thereof to the eNB through a PUSCH. In the case of periodic reporting, a period and an offset of the period are semi-statically signaled to each UE through a higher layer signal on a subframe basis. Each UE delivers CSI considering the transmission mode thereof to the eNB through a PUCCH in a predetermined period. If uplink data is simultaneously present in a subframe in which CSI is transmitted, the CSI is transmitted with the uplink data through a PUSCH. The eNB transmits transmission timing information suitable for each UE to each UE in consideration of channel state of each UE, UE distribution in a cell, etc. The transmission timing information includes a period in which CSI is transmitted, an offset, etc. and may be transmitted to each UE through an RRC message.

FIGS. 8 to 11 illustrate periodic CSI reporting in LTE.

Referring to FIG. 8, 4 CQI reporting modes are present in LTE. Specifically, the CQI reporting modes are categorized into a wideband (WB) CQI mode and a subband (SB) CQI mode according to CQI feedback type and into a no PMI mode and a single PMI mode according to whether a PMI is transmitted. Each UE receives information composed of a combination of a period and an offset through RRC signaling for periodic CQI reporting.

Figure 9:
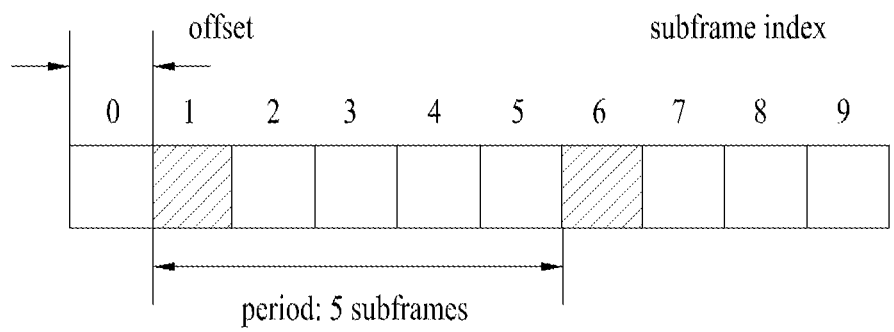

FIG. 9 illustrates an example of transmitting CSI when information representing {period '5', offset '1'} is signaled to a UE. Referring to FIG. 9, upon reception of the information representing a period of '5' and an offset of '1', the UE transmits CSI in 5 subframes with an offset corresponding to one subframe from subframe #0 in a direction in which the subframe index increases. While the CSI is basically transmitted through a PUCCH, when a PUSCH for transmitting data is present in the same time, the CSI is transmitted with the data through the PUSCH. The subframe index is composed of a system frame number $n_f$ and a slot index $n_s$ (0 to 19). Since a subframe includes two slots, the subframe index can be defined by $10*n_f+\text{floor}(n_s/2)$. Here, floor( ) denotes a floor function.

A scheme of transmitting a WB CQI only and a scheme of transmitting both the WB CQI and SB CQI are present. According to the scheme of transmitting the WB CQI only, CQI information about the overall band is transmitted in subframes corresponding to a CQI transmission period. When a PMI also needs to be transmitted according to PMI feedback type, as illustrated in FIG. 8, the PMI and CQI are transmitted together. According to the scheme of transmitting both the WB CQI and SB CQI, the WB CQI and SB CQI are alternately transmitted.

Figure 10:
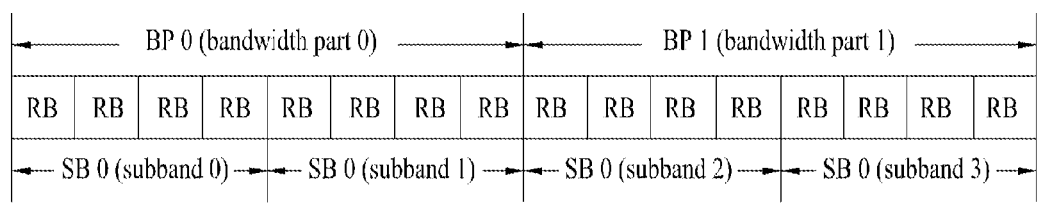
Figure 11:
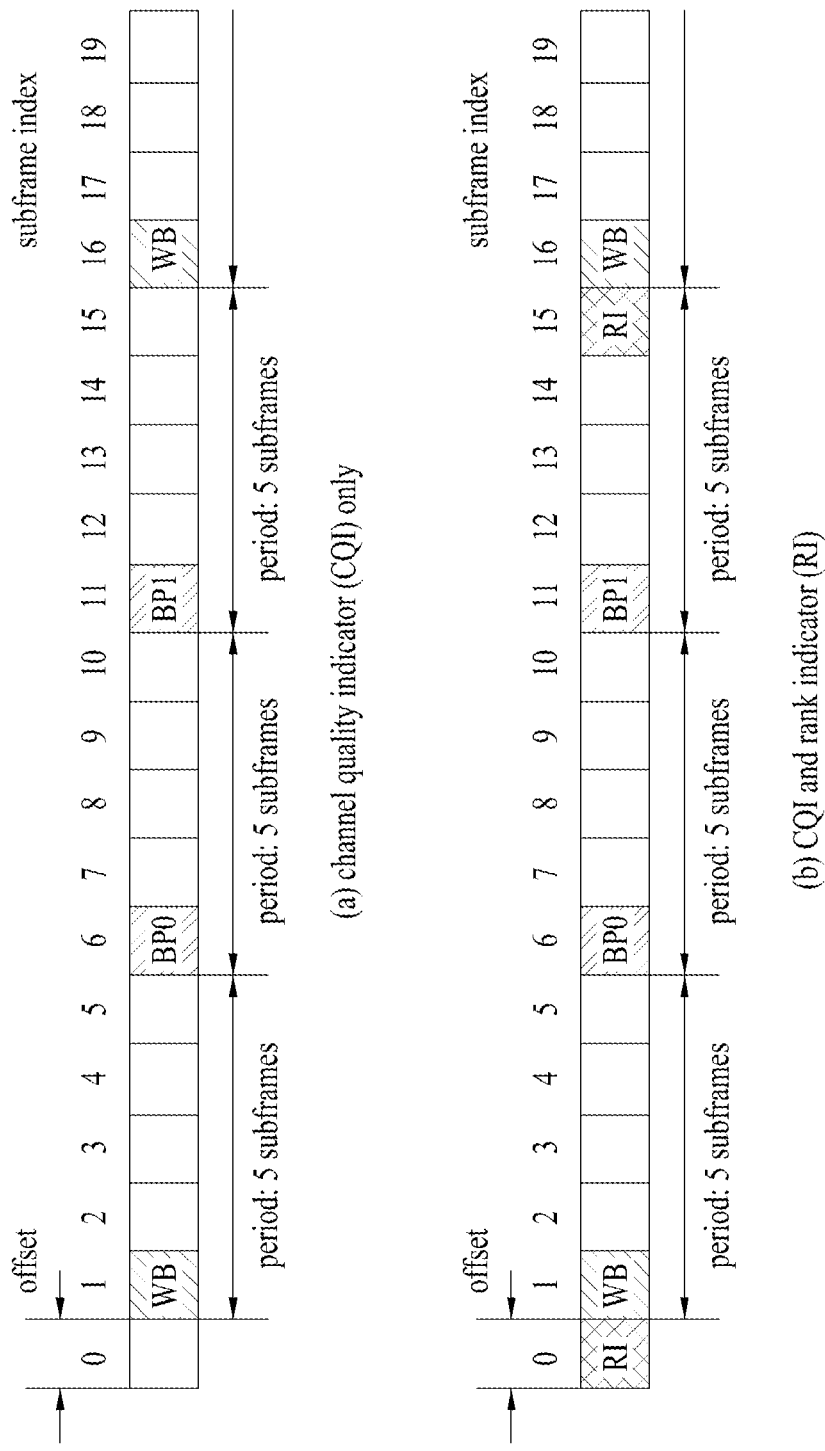

FIG. 10 illustrates a system having a system bandwidth corresponding to 16 RBs. In this case, it is assumed that the system bandwidth is composed of two bandwidth parts (BPs) BP0 and BP1 each of which includes two subbands (SBs) SB0 and SB1 each of which is composed of 4 RBs. However, the number of BPs and the size of each SB may be varied according to system bandwidth. Furthermore, the number of SBs constituting each BP may depend on the number of RBs, the number of BPs and SB size.

In the case of the scheme of transmitting both the WB CQI and SB CQI, the WB CQI is transmitted in a first CQI transmission subframe and a CQI corresponding to the SB having a good channel state between SB0 and SB1 belonging to BP0 and the index of the corresponding SB are transmitted in the next CQI transmission subframe. Then, a CQI corresponding to the SB in good channel state between SB0 and SB1 belonging to BP1 and the index of the corresponding SB are transmitted in the next CQI transmission subframe. In this manner, the WB CQI is transmitted and then CQI information about respective BPs is sequentially transmitted. CQI information about BPs can be sequentially transmitted one to four times between two WB CQIs. For example, if CQI information about BPs is sequentially transmitted once between two WB CQIs, the CQI information can be transmitted in the order of WB CQI=>BP0 CQI=>BP1 CQI=>WB CQI. If CQI information about BPs is sequentially transmitted four times between two WB CQIs, the CQI information can be transmitted in the order of WB CQI=>BP0 CQI=>BP1 CQI=>BP0 CQI=>BP1 CQI=>BP0 CQI=>BP1 CQI=>BP0 CQI=>BP1 CQI=>WB CQI. Information about how many times each BP CQI is sequentially transmitted is signaled by a higher layer (e.g. RRC layer).

FIG. 11(a) illustrates an example of transmitting both the WB CQI and SB CQI when information representing {period '5', offset '1'} is signaled to a UE. Referring to FIG. 11(a), a CQI can be transmitted only in subframes corresponding to a signaled period and offset irrespective of CQI type. FIG. 11(b) illustrates a case in which an RI is additionally transmitted. The RI can be signaled by a higher layer (e.g. RRC layer) as a combination of information about a multiple of the WB CQI transmission period, which corresponds to an RI transmission period, and an offset in the RI transmission period. The offset of the RI is signaled as a value relative to the offset of the CQI. For example, if the offset of the CQI is '1' and the offset of the RI is '0', the RI has the same offset as that of the CQI. The offset of the RI is defined as 0 or a negative value. Specifically, FIG. 11(b) assumes a case in which the RI transmission period is equal to the WB CQI transmission period and the offset of the RI is '−1' in the same environment as FIG. 11(a). The RI transmission period is identical to the WB CQI transmission period since the RI transmission period is equal to the WB CQI transmission period. The offset of the RI is '−1', and thus the RI is transmitted on the basis of '−1' (i.e. subframe #0) with respect to the CQI offset '1'. When the RI offset is '0', the WB CQI transmission subframe and RI transmission subframe overlap. In this case, the WB CQI is dropped and the RI is transmitted.

Figure 12:
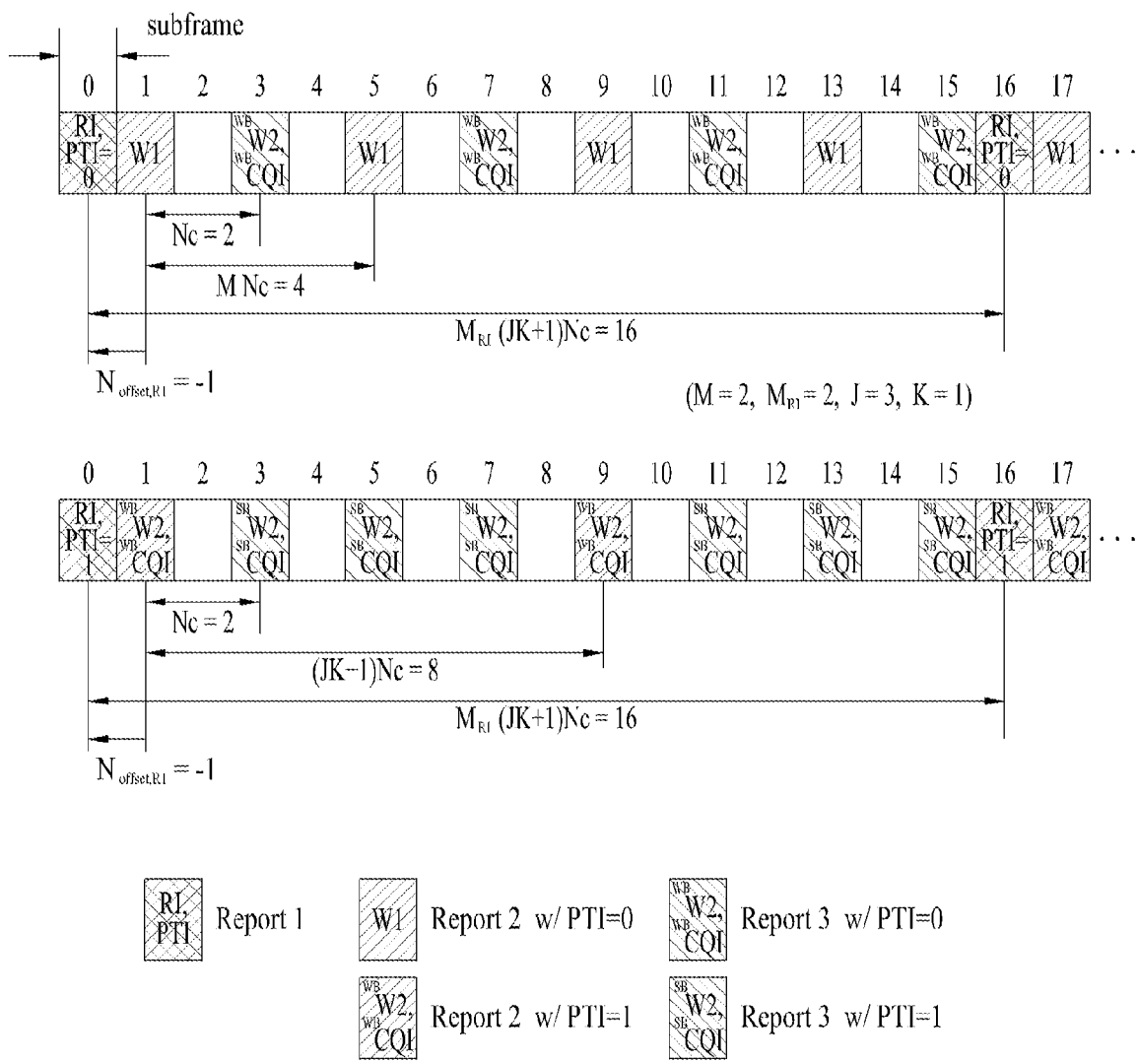
FIG. 12 illustrates periodic channel state information reporting in LTE-A.

FIG. 12 illustrates periodic CSI reporting, which is being discussed in LTE-A. In the case of mode X−1, LTE-A sets a precoder type indication (PTI) parameter which is a 1-bit indicator and considers two types of subdivided periodic reporting modes according to PTI values, as illustrated in FIG. 12. In FIGS. 12, W1 and W2 are codewords constituting a hierarchical codebook described with reference to Equations 8 and 9. Both W1 and W2 need to be determined in order to set a precoding matrix W accomplished by combining W1 and W2.

Referring to FIG. 12, in the case of periodic reporting, different reports corresponding to Report 1, Report 2 and Report 3 are transmitted in different repetition periods. Report 1 reports an RI and a 1-bit PTI value. Report 2 reports WB W1 (when PTI=0) or WB W2 and a WB CQI (when PTI=1). Report 3 reports WB W2 and WB CQI (when PTI=0) or SB W2 and SB CQI (when PTI=1).

Report 2 and Report 3 are transmitted in subframes (referred to as a first subframe set for convenience) having subframe indices that satisfy $(10*n_f+\text{floor}(n_s/2)-N_{offset,CQI}) \mod(N_c)=0$. $N_{offset,CQI}$ corresponds to the offset value illustrated in FIG. 9 and $N_c$ denotes a subframe spacing between neighboring Reports 2 or Reports 3. FIG. 12 illustrates a case in which $N_{offset,CQI}=1$ and $N_c=2$. The first subframe set is composed of subframes having odd-numbered indices. Furthermore, $n_f$ denotes a system frame number (or radio frame index), $n_s$ denotes a slot index in a radio frame, floor( ) represents a floor function and 'A mod B' represents the remainder obtained by dividing A by B.

Report 2 is located in some subframes in the first subframe set and Report 3 is located in the remaining subframes. Specifically, Report 2 is located in subframes having subframe indices that satisfy $(10*n_f+\text{floor}(n_s/2)-N_{offset,CQI}) \mod(H \cdot N_c)=0$. Accordingly, Report 2 is transmitted at an interval of $H \cdot N_c$ and one or more first subframes disposed between neighboring Reports 2 are used to transmit Report 3. When PTI=0, H=M and M is determined by higher layer signaling. FIG. 12 illustrates a case in which M=2. When PTI=1, H=J·K+1, K is determined by higher layer signaling and J denotes the number of BPs. FIG. 12 illustrates a case in which J=3 and K=1.

Report 1 is transmitted in subframes having subframe indices that satisfy $(10*n_f+\text{floor}(n_s/2)-N_{offset,CQI}-N_{offset,RI}) \mod (M_{RI} \cdot (J \cdot K+1) \cdot N_c)=0$. $M_{RI}$ is determined by higher layer signaling. $N_{offset,RI}$ denotes a relative offset value for an RI. FIG. 12 illustrates a case in which $M_{RI}=2$ and $N_{offset,RI}=-1$. Report 1 transmission timing does not correspond to Report 2 transmission timing according to $N_{offset,RI}=-1$. When a UE calculates the RI, W1 and W2, the RI, W1 and W2 are related to one another. For example, W1 and W2 are calculated based on the RI and W2 is calculated based on W1. Upon reporting of Report 2 and Report 3 after Report 1, the corresponding eNB can be aware of a final W from W1 and W2.

When $N_{offset,RI}$ is set to 0, Report 1 transmission subframes and Report 2 transmission subframes overlap. In this case. Report 2 can be dropped and Report 1 can be transmitted according to priority of CSI in consideration of LTE operation. Since LTE does not use a hierarchical codebook, no problem are encountered even when Report 2 is dropped in a collided subframe because whole codebook related information (e.g. a PMI) can be obtained through Report 3.

However, dropping of Report 2 may be problematic in LTE-A using a hierarchical codebook because W1 and W2 are respectively reported through Report 2 and Report 3 and they need to be combined in LTE-A. Accordingly, if Report 2 (W1) is dropped due to collision between Report 1 (RI) and Report 2 (W1), Report 3 (W2) subsequent to subframes corresponding to $N_c$ may become insignificant when W1 is not reported.

To solve this problem, CSI feedback and a method of configuring a codebook according to CSI feedback when Report 1 and Report 2 (or Report 3) are redundant/collided in the same subframe are described with reference to FIGS. 13 to 17.

In FIGS. 13 to 17, in case (a) PTI=0 and M=2 and case (b) PTI=0 and M=4 are illustrated by way of example. In addition, it is assumed that $N_c=2$, $M_{RI}=2$, J=3, K=1, $N_{offset,CQI}=1$ and $N_{offset,RI}=0$. Since $N_c=2$, Report 2/3 is transmitted at an interval of two subframes. In the case of M=2 (a), reporting is performed in the order of Report 2 (W1)=>Report 3 (W2)=>Report 2 (W1)=>Report 3 (W2). In the case of M=4 (b), reporting is performed in the order of Report 2 (W1)=>Report 3 (W2) (three times)=>Report 2 (W1)=>Report 3 (W2) (three times). Report 1 (RI) is transmitted at an interval of 16 subframes and collides with Report 2 (W1) in (a) and (b) of FIGS. 13 to 17 since $N_{offset,RI}=0$. It is assumed that only Report 1 (RI) is transmitted and Report 2 (W1) is dropped according to CSI report priority in subframes in which Report 1 (RI) and Report 2 (W1) collide with each other.

In the case of FIGS. 13 to 17, Report 2 (W1) is dropped in a subframe corresponding to a subframe index (SI) #16n+1 (i.e. SI=1, 17, . . . ). CSI feedback that becomes a problem due to dropping of Report 2 (W1) in a subframe corresponding to SI=16n+1 involves Report 3 (W2) corresponding to SI=16n+3 in the case of (a) and Report 3 (W2) corresponding to SI=16n+3, 5 and 6 in the case of (b), for example. Except for Report 3 causing problematic CSI feedback. Report 2 (W1) and Report 3 (W2) are paired, and thus there is no problem in CSI feedback and codebook configuration. Report 3 (W2) having a problem due to dropping of Report 2 (W1) is referred to as unpaired Report 3 (W2) or orphan Report 3 (W2) for convenience. That is, in FIGS. 13 to 17, orphan Report 3 (W2) is Report 3 (W2) corresponding to SI=16n+3 in the case of (a) and Report 3 (W2) corresponding to SI=16n+3, 5 and 6 in the case of (b).

FIGS. 13 to 17 illustrate various schemes for performing CSI feedback/configuring a codebook according to embodiments of the present invention. Specifically, FIGS. 13 to 17 illustrate an operation of a UE when Report 3 (W2) needs to be transmitted while Report 2 (W1) is dropped after the RI is reported through Report 1 and codebook configuration/precoding matrix confirmation schemes according to the operation of the UE.

FIG. 13 illustrates a method for performing CSI feedback/configuring a codebook according to scheme 1 proposed by the present invention. Referring to FIG. 13, in the case of orphan Report 3 (W2) [(a) SI=3, (b) SI=3, 5 and 7], the UE does not calculate a PMI/CQI with respect to an RI updated through Report 1 corresponding to SI=1 and can determine W2 using the latest W1 with respect to an RI immediately before update. CSI feedback using the latest W1 with respect to the RI immediately before update needs to be maintained until the next Report 2 (W1) [(a) SI=5, (b) SI=9] is transmitted. That is, when an RI value is varied according to radio channel situation, if there is no time to report W1 even if a new RI is reported through Report 1, a current W2 report can be significantly used by reporting W2 based on previous RI and W1.

FIG. 14 illustrates a method for performing CSI feedback/configuring a codebook according to scheme 2 proposed by the present invention. Referring to FIG. 14, orphan Report 3 (W2) is handled based on other reports. CSI feedback/codebook configuration is performed according to the scheme (i.e. scheme 1) of FIG. 13 for M−2 orphan Reports 3 (W2) [(a) no corresponding SI, (b) SI=3, 5] left when the last orphan Report 3 is excluded from M−1 orphan Reports 3 (W2) present before the first Report 2 (W1) [(a) SI=5, (b) SI=9] following Report 1.

Subsequently, for W2 corresponding to the last Report 3 (W2) [(a) SI=3, (b) SI=7] from among the M−1 Reports 3 (W2), W1 and W2 can be determined using an RI value updated through Report 1 (SI=1). W2 calculated using the RI value updated through Report 1 is transmitted in only a CSI feedback subframe [(a) SI=3, (b) SI=7] immediately prior to the first Report 2 [(a) SI=5, (b) SI=9] present after Report 1 [(a) SI=1, (b) SI=1]. Subsequent CSI feedback/codebook configuration is performed according to a conventional procedure since Report 2 has already been transmitted. That is, W2 of non-orphan Report 3 is determined based on W1 of the latest Report 2 before reporting time. For example, in the case of (a). W2 corresponding to SI=7 is determined based on W1 corresponding to SI=5, W2 corresponding to SI=11 is determined based on W1 corresponding to SI=9, and W2 corresponding to SI=15 is determined based on W1 corresponding to SI=13. In the case of (b), W2s corresponding to SI=11, 13 and 15 are determined based on W1 corresponding to SI=9.

Scheme 1 and scheme 2 differ in terms of feedback information between Reports 3 [(a) SI=3, (b) SI=7] immediately before the first Reports 2 [(a) SI=5, (b) SI=9] subsequent to drop of Report 2 [(a)/(b) SI=1] in FIGS. 13 and 14. Advantages and disadvantages of scheme 1 and scheme 2 are described below.

Scheme 1 has the advantage that a final PMI W can be used immediately from when Report 3 is transmitted after Report 1. That is, in the case of FIG. 13(a), W2 reported at a time corresponding to SI=3 can be immediately used to generate a new PMI W by being combined with W1 before RI update. In the case of FIG. 13(b), W2s reported in subframes corresponding to SI=3, 5 and 7 can be immediately used to generate a new PMI W by being combined with W1 before RI update. Scheme 1 has disadvantages that a new PMI W cannot be immediately generated when new W1 with respect to the updated RI is reported [(a) SI=5, (b) SI=9] in FIG. 13 and new PMI W for the updated RI can be generated only when corresponding W2 is reported when the next W2 is reported [(a) SI=7, (b) SI=11]. That is, it is impossible to determine a new PMI W with respect to the updated RI in a period [(a) SI=1 to 5, (b) SI=1 to 9] from when Report 2 is dropped to the first Report 2.

Similarly to scheme 1, scheme 2 illustrated in FIG. 14 cannot determine a new PMI with respect to the updated RI in a period from when Report 2 is dropped to Report 3 immediately prior to the first Report 2 [(a) SI=3, (b) SI=7]. However, scheme 2 is distinguished from scheme 1 in that a new PMI can be determined for an RI updated at the first Report 2 [(a) SI=5, (b) SI=9] present after Report 2 is dropped because W2 with respect to the updated RI and W1 is reported through Report 3 immediately before the first Report 2. Accordingly, the time when the new PMI W with respect to the updated RI can be used is advanced by $N_c$ subframes.

FIG. 15 illustrates a method for performing CSI feedback/configuring a codebook according to scheme 3 proposed by the present invention. According to scheme 3, when Report 2 (W1) is dropped, Report 3 (W2) with respect to an RI that is not updated is dropped. When scheme 3 is applied to schemes 1 and 2, the UE does not feed back W2 determined based on W1 that has been determined using an RI immediately before update instead of an RI updated through Report 1. In this case, the eNB cannot configure a new PMI W with respect to the updated RI in a period in which W2 is not fed back.

FIG. 15 illustrates an example of applying scheme 3 to FIG. 14. In the case of 14(b), Reports 3 (W2) corresponding to SI=3 and 5 are determined based on W1 that has been determined using an RI immediately before update instead of an updated RI corresponding to SI=1. Accordingly, the Reports 3 corresponding to SI=3 and 5 are not fed back and are dropped according to scheme 3. When scheme 3 is applied to FIG. 13, which is not shown, Report 3 (W2) corresponding to SI=3 in FIG. 13(a) and Reports 3 (W2) corresponding to SI=3, 5 and 7 in FIG. 13(b) are determined based on a non-updated RI and W1. Accordingly, all the Report 3 (W2) corresponding to SI=3 in FIG. 13(a) and Reports 3 (W2) corresponding to SI=3, 5 and 7 in FIG. 13(b) are dropped according to scheme 3. That is, when scheme 3 is applied to scheme 1, all Reports 3 between Report 1 transmitting an RI and the first Report 2 are dropped if Report 2 (W1) is dropped due to collision between Report 1 (RI) and Report 2 (W1).

Scheme 3 can be understood as a method of actually transmitting only significant Report 3 using radio resources. When a radio channel is varied as an RI changes, it is desirable to drop W2 rather than reporting W2 based on an RI value before being changed and W1 to reduce UE battery consumption or save uplink resources (e.g. PUCCH resources and PUSCH resources).

Furthermore, scheme 3 can be applied to backhaul link operation in a relay node (RN) system. In this case, UL backhaul subframes (e.g. subframes corresponding to SI=3 and 5 in FIG. 14(b)) in which Report 3 (W2) is dropped can be used for UL subframe transmission of an access link. For example, UL backhaul subframes (e.g. subframes corresponding to SI=3 and 5 in FIG. 14(b)) in which CSI feedback is dropped can be used for UL subframe retransmission of an access link upon occurrence of UL subframe collision (e.g. ACK/NACK collision, etc) between a backhaul link and the access link. Here, a UL backhaul subframe used for UL subframe retransmission of the access link, from among UL backhaul subframes in which CSI is dropped, may be a UL backhaul subframe corresponding to a UL access subframe (e.g. subframe corresponding to SI=n+4) linked to a DL access subframe (e.g. SI=n). When the UL backhaul subframe corresponding to the linked UL access subframe (e.g. subframe corresponding to SI=n+4), from among the UL backhaul subframes in which CSI is dropped, is not available, an available or valid UL backhaul subframe closest or and following the linked UL access subframe (e.g. subframe corresponding to SI=n+4) can be used for UL subframe retransmission of the access link.

FIG. 16 illustrates a method for performing CSI feedback/configuring a codebook according to scheme 4 proposed by the present invention. According to scheme 4, when two or more orphan Reports 3 (W2) are consecutively present, the first orphan Report 3 (W2) can be replaced by Report 2 (W1) (that is, the first orphan Report 3 (W2) is dropped). In this case, Report 2 (W1) is reported, and thus subsequent Reports 3 (W2) are determined based on W1 of the latest Report 2 according to the conventional procedure. When orphan Reports 3 (W2) are discontinuously present, operations related to orphan Report 3 (W2) can conform to one of schemes 1, 2 and 3.

FIG. 16 illustrates an example of applying scheme 4 to FIG. 14. Referring to FIG. 16(a), since orphan Reports 2 (corresponding to SI=3, 19, . . . ) are discontinuously present, CSI feedback/codebook configuration is determined according to scheme 2 of FIG. 14. That is, orphan Report 3 (W2) is determined based on W1 of Report 2 subsequent thereto. Referring to FIG. 16(b), when Report 2 (W1) is dropped in the subframe corresponding to SI=1, three orphan Reports 3 (W2) (corresponding to SI=3, 5 and 7) are consecutively present. In this case, the first orphan Report 3 (corresponding to SI=3) from among the three orphan Reports 3 (corresponding to SI=3, 5 and 7) is replaced by Report 2 (W1) calculated based on an updated RI according to scheme 4. Since Report 2 (W1) is fed back, the remaining two orphan Reports 3 (corresponding to SI=5 and 7) can be determined based on the replaced Report 2 (W1) (corresponding to SI=3).

According to scheme 4, when Report 2 (W1) is dropped due to collision between Report 1 (RI) and Report 2 (W1), both new W1 and W2 can be reported at an interval of subframes corresponding to $2N_c$ after Report 1 irrespective of the feedback period of each report. Accordingly, new PMI W to which the updated RI has been applied can be obtained as fast as possible.

FIG. 17 illustrates a method for performing CSI feedback/configuring a codebook according to scheme 5 proposed by the present invention. According to scheme 5, when one or more orphan Reports 3 (W2) are consecutively present, the first orphan Report 3 (W2) can be replaced by Report 2 (W1). Since Report 2 (W1) is reported, W2 of orphan Report 3 is determined based on W1 of the latest Report 2. If orphan Reports 3 (W2) are discontinuously present (that is, when CSI feedback immediately after orphan Report 3 corresponds to Report 2 (W1)), two Reports 2 (W1) can be continuously reported according to scheme 5. In this case, both Reports 2 (W1) can simply be fed back, an operation according to orphan Report 3 (W2) can be performed according to scheme 1 or 2 or orphan Report 3 (W2) can be dropped.

Referring to FIG. 17, when Report 2 (W1) is dropped due to collision between Report 1 (RI) and Report 2 (W1), Report 3 (W2) [(a) SI=3, (b) SI=3] initially present after drop of Report 2 can be replaced by Report 2 (W1) with respect to an updated RI. Upon feedback of Report 2 (W1), orphan Report 3 (W2) is determined based on W1 of the latest Report 2 according to the conventional procedure. In the case of FIG. 17(a), since M=2, when the first orphan Report 3 (W2) (corresponding to SI=3) after Report 2 (W1) is replaced by Report 2 (W1) with respect to the updated RI, two Reports 2 (W1) are consecutively present. While FIG. 17(a) illustrates a case in which the two consecutive Reports 2 (W1) are all fed back, an operation according to scheme 1 or 2 may be performed or in the case of 17(a), Report 3 (W2) (corresponding to SI=3) may be dropped.

A description will be given of a method for performing CSI feedback/configuring a codebook according to scheme 6 proposed by the present invention. According to scheme 6, when higher layer signaling that causes unnecessary initial Report(s) 3 to be fed back is applied to the UE, the UE can determine the higher layer signaling as misconfiguration. In this case, the UE can change parameters (e.g. $N_{offset,RI}$, M, etc.) for CSI feedback configuration to predetermined values in order to avoid drop of Report 2 (W1) or minimize the effect of drop of Report 2 (W1). For example, when a combination of $N_{offset,RI}=0$ and M=4 is signaled to the UE through higher layer signaling, the UE can change $N_{offset,RI}$ such that a combination of $N_{offset,RI}=-1$ and M=4 is obtained or change M such that a combination of $N_{offset,RI}=-1$ and M=2 is obtained. $N_{offset,RI}$ and M may be changed to different specific values. While $N_{offset,RI}$ and M are signaled in a combined form in the above description, $N_{offset,RI}$ and M may be independently signaled.

While schemes 1 to 6 have been respectively described for convenience, they may be combined. Furthermore, while the present invention has been described centering on periodic reporting (e.g. mode 2-1) through a PUCCH discussed in LTE-A, the hierarchical codebook structure and the proposed schemes (i.e. schemes 1 to 6) can be combined, extended and applied to various extensions and modifications including a case in which the dimensions of the codebook are increased.

Figure 18:
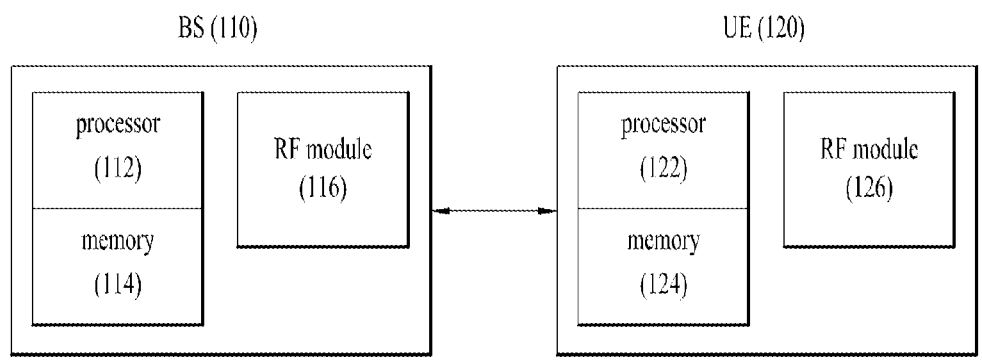
FIG. 18 illustrates an eNB and a UE applicable to the present invention.

FIG. 18 illustrates a BS and a UE applicable to an embodiment of the present invention. In case of a wireless communication system including a relay, communication is performed between a BS and the relay in a backhaul link and between the relay and a UE in an access link. Accordingly, the BS or UE can be replaced by a relay as necessary.

Referring to FIG. 18, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While application of the method and device for reporting channel state information in a 3GPP LTE wireless communication system has been described, the method and device for reporting channel state information in a wireless communication system can be applied to various wireless communication systems other than 3GPP LTE.

The invention claimed is:

1. A method for reporting channel state information by a UE in a wireless communication system, the method comprising:
    carrying out operations for periodic reporting of first channel state information; and
    carrying out operations for periodic reporting of second channel state information,
    wherein a reporting period of the first channel state information is longer than a reporting period of the second channel state information and the second channel state information is determined on the basis of the first channel state information,
    wherein when a report of the first channel state information is dropped at a first time, at least one report of the second channel state information, scheduled to be performed first between the first time and a second time for the next report of the first channel state information, is dropped, and
    wherein, when a plurality of reports of the second channel state information is scheduled between the first time and the second time, only the last second channel state information, from among the scheduled plurality of reports of the second channel state information, is reported and the last second channel state information is determined based on the first channel state information, scheduled to the second time.

2. The method according to claim 1, wherein at least one report of the second channel state information, dropped between the first time and the second time, is replaced by the report of the first channel state information.

3. The method according to claim 1, wherein, when a plurality of reports of the second channel state information are scheduled between the first time and the second time, only the first report of the second channel state information from among the plurality of reports of the second channel state information is replaced by the report of the first channel state information.

4. The method according to claim 1, wherein the first channel state information includes a first precoding matrix indicator (PMI), the second channel state information includes a second PMI and the first PMI and the second PMI are combined and used to configure a codebook.

5. The method according to claim 4, wherein the first PMI is a long term PMI and the second PMI is a short term PMI.

6. The method according to claim 1, wherein the first channel state information and the second channel state information are transmitted through a physical uplink control channel (PUCCH).

7. A UE configured to transmit channel state information in a wireless communication system, the UE comprising:
 an RF module; and
 a processor,
 wherein the processor carries out operations for periodic reporting of first channel state information and carries out operations for periodic reporting of second channel state information,
 wherein a reporting period of the first channel state information is longer than a reporting period of the second channel state information and the second channel state information is determined on the basis of the first channel state information,
 wherein when a report of the first channel state information is dropped at a first time, at least one report of the second channel state information, scheduled to be performed first between the first time and a second time for the next report of the first channel state information, is dropped, and
 wherein, when a plurality of reports of the second channel state information is scheduled between the first time and the second time, only the last second channel state information, from among the scheduled plurality of reports of the second channel state information, is reported and the last second channel state information is determined based on the first channel state information, scheduled to the second time.

8. The UE according to claim 7, wherein at least one report of the second channel state information, dropped between the first time and the second time, is replaced by the report of the first channel state information.

9. The UE according to claim 7, wherein, when a plurality of reports of the second channel state information are scheduled between the first time and the second time, only the first report of the second channel state information from among the plurality of reports of the second channel state information is replaced by the report of the first channel state information.

10. The UE according to claim 7, wherein the first channel state information includes a first precoding matrix indicator (PMI), the second channel state information includes a second PMI and the first PMI and the second PMI are combined and used to configure a codebook.

11. The UE according to claim 10, wherein the first PMI is a long term PMI and the second PMI is a short term PMI.

12. The UE according to claim 7, wherein the first channel state information and the second channel state information are transmitted through a physical uplink control channel (PUCCH).

\* \* \* \* \*